US012639066B1

(12) United States Patent
Vadaparty et al.

(10) Patent No.: US 12,639,066 B1
(45) Date of Patent: May 26, 2026

(54) STANDARDIZING ENTERPRISE SOFTWARE CODE THROUGH LLMs

(71) Applicant: Morgan Stanley Services Group Inc., New York, NY (US)

(72) Inventors: Kumar Vadaparty, Belle Mead, NJ (US); Kallol Duttagupta, Basking Ridge, NJ (US); Kundan Sen, Plainview, NY (US); Thomas Mathew, Parsippany, NJ (US); Trevor Brosnan, Scottsdale, AZ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/349,305

(22) Filed: Oct. 3, 2025

Related U.S. Application Data

(63) Continuation of application No. 19/191,343, filed on Apr. 28, 2025, now Pat. No. 12,455,736.

(51) Int. Cl.
G06F 8/72 (2018.01)
G06F 8/75 (2018.01)
G06F 8/76 (2018.01)
(52) U.S. Cl.
CPC ................. G06F 8/72 (2013.01); G06F 8/75 (2013.01); G06F 8/76 (2013.01)
(58) Field of Classification Search
CPC ....................................................... G06F 8/72
See application file for complete search history.

(56) References Cited

U.S. PATENT DOCUMENTS

| | | | |
|---|---|---|---|
| 11,042,369 B1 | 6/2021 | Kimball et al. | |
| 11,150,880 B1 | 10/2021 | Parisa et al. | |
| 11,321,066 B2 | 5/2022 | Yu et al. | |
| 11,354,120 B1 | 6/2022 | Zhang et al. | |
| 11,409,505 B1 | 8/2022 | Chartrand | |
| 11,544,046 B1 * | 1/2023 | Zhang ..................... | G06F 8/427 |
| 11,579,868 B1 | 2/2023 | Zhang et al. | |

(Continued)

OTHER PUBLICATIONS

Dau et al., "XMainframe: A Large Language Model for Mainframe Modernization" (Year: 2024).*

(Continued)

*Primary Examiner* — Phillip H Nguyen
(74) *Attorney, Agent, or Firm* — K&L Gates LLP

(57) ABSTRACT

A computer-implemented method and system standardize code patterns within enterprise software environments. A code modernization system utilizes a Large Language Model (LLM) and a specialized prompt library. The library includes pattern recognition prompts to guide the LLM in identifying specific code patterns within selected software code, potentially using enterprise-specific context. It also includes standardized solution prompts to guide the LLM in generating replacement code conforming to predefined enterprise standards for the identified patterns. The system orchestrates communication, transmitting code and relevant prompts to the LLM and receiving identified patterns and subsequently the generated standardized replacement code. This automated approach facilitates improved code quality, consistency, maintainability, and can support code translation efforts within the enterprise.

18 Claims, 6 Drawing Sheets

(56) References Cited

U.S. PATENT DOCUMENTS

| | | | |
|---|---|---|---|
| 11,698,829 | B2 | 7/2023 | Aradhya et al. |
| 12,360,791 | B1 | 7/2025 | Vadaparty et al. |
| 2010/0083221 | A1* | 4/2010 | Naik ......................... G06F 8/72 |
| | | | 717/108 |
| 2015/0268953 | A1* | 9/2015 | Koezuka ................... G06F 8/71 |
| | | | 717/121 |
| 2016/0062753 | A1* | 3/2016 | Champagne .............. G06F 8/51 |
| | | | 717/137 |
| 2022/0164170 | A1 | 5/2022 | Benton et al. |
| 2022/0245000 | A1 | 8/2022 | Kalia et al. |
| 2023/0305822 | A1 | 9/2023 | Ferrucci et al. |
| 2024/0045662 | A1 | 2/2024 | Jain et al. |
| 2024/0256235 | A1 | 8/2024 | Potti et al. |
| 2024/0302600 | A1 | 9/2024 | Huang et al. |
| 2024/0311087 | A1 | 9/2024 | Bathula |
| 2024/0394481 | A1 | 11/2024 | Edwards et al. |
| 2024/0403792 | A1 | 12/2024 | Goutal et al. |
| 2024/0411535 | A1 | 12/2024 | Ken-Kwofie et al. |
| 2024/0411746 | A1 | 12/2024 | Shu |
| 2024/0419917 | A1 | 12/2024 | Clement et al. |
| 2025/0004760 | A1 | 1/2025 | Maciel Dos Santos et al. |
| 2025/0004915 | A1 | 1/2025 | Rudenko et al. |
| 2025/0013436 | A1 | 1/2025 | Mohanty |
| 2025/0053389 | A1* | 2/2025 | Jaggumantri ........... G06F 40/20 |
| 2025/0053397 | A1* | 2/2025 | Lee ........................... G06F 8/51 |
| 2025/0063101 | A1 | 2/2025 | Cegielski-Johnson et al. |

OTHER PUBLICATIONS

Diggs et al., "Leveraging LLMs for Legacy Code Modernization: Challenges and Opportunities for LLM-Generated Documentation" (Year: 2024).*

Sahil Bhatia et al., "Verified Code Transpilation with LLMs", Jun. 2024, 19 Pages.

Hasan Ferit Eniser et al., "Towards Translating Real-World Code with LLMs: A Study of Translating to Rust", May 2024, 11 Pages.

Rangeet Pan et al., "Lost in Translation: A Study of Bugs Introduced by Large Language Models while Translating Code", Jan. 2024, 13 Pages.

IBM News, "COBOL programmers are getting harder to find. IBM's code-writing AI can help", Oct. 2023, 7 Pages.

* cited by examiner

1

STANDARDIZING ENTERPRISE SOFTWARE CODE THROUGH LLMs

CROSS-REFERENCE TO RELATED APPLICATIONS

The present application is related to the following U.S. patent applications, which are incorporated herein by reference in their entirety: (1) Ser. No. 18/787,750, filed Jul. 29, 2024, titled "Generating New Software Code from Legacy Software Code Using Large Language Models," by applicant Morgan Stanley Services Group Inc. and inventors K. Vadaparty et al., issued as U.S. Pat. No. 12,360,791 on Jul. 15, 2025, and (2) Ser. No. 19/080,275, filed Mar. 14, 2025, titled "Multi-Language Program and Data Flow Analysis Using LLM," by applicant Morgan Stanley Services Group Inc. and inventors K. Duttagupta et al.

BACKGROUND

Generative AI large language models (LLMs) operate by predicting the most likely sequence of words based on vast amounts of training data. These models are trained on diverse text sources, allowing them to understand context, syntax, semantics, and even programming languages. At their core, LLMs use neural network architectures, particularly transformers, to process input text and generate coherent, contextually relevant responses. Through a process known as tokenization, text is broken down into manageable pieces, and the model assigns probabilities to different possible continuations, selecting the most suitable one based on patterns it has learned.

These models can be powerful tools for software development in an enterprise setting. They can generate production-quality code by understanding specifications, completing partially written functions, detecting and fixing bugs, and suggesting optimizations. By analyzing large repositories of open-source and proprietary code, LLMs can offer solutions that align with best practices, enhancing developer productivity and reducing time-to-market. Enterprises can integrate these AI tools into their development pipelines to assist with everything from boilerplate code generation to complex algorithm design, ultimately streamlining the software engineering process.

One particularly valuable use of generative AI is in modernizing legacy systems. Organizations with aging codebases written in languages like COBOL, Fortran, or even early versions of Java or C++ can leverage LLMs to automate code conversion to modern languages such as Python, JavaScript, or Rust. The AI can analyze the structure, logic, and dependencies of the legacy program, translating them into equivalent constructs in the target language while preserving functionality. This can significantly reduce the cost and effort associated with manual code migration, helping enterprises modernize their tech stacks more efficiently.

However, the use of generative AI for enterprise software development is not without challenges. One major concern is the accuracy and reliability of the generated code. While AI-generated code may appear syntactically correct, it can introduce subtle logic errors, security vulnerabilities, or inefficiencies that require careful review. Another challenge lies in the explainability of AI-generated solutions-developers may struggle to understand why the AI made certain decisions, making debugging and maintenance more difficult. Furthermore, legacy code translation can be complex, as AI may misinterpret nuanced business logic or fail to account for edge cases, necessitating extensive human oversight. Lastly, reliance on AI-generated code without rigorous validation can lead to technical debt, where organizations accumulate hard-to-maintain, poorly structured code over time.

SUMMARY

In one general aspect, the present invention is directed to systems and methods for standardizing software code patterns using large language models (LLMs), particularly as part of modernizing and translating software code within an enterprise environment. The system and/or method can be used to modernize an enterprise's software code. The system comprises, in various embodiments, a code repository for storing enterprise software code containing various code patterns and a prompt library storing distinct sets of prompts. The system also comprises a code modernization system communicatively coupled with an LLM, as well as the code repository and prompt library.

The prompt library includes pattern recognition prompt sets designed to direct the LLM to identify specific code patterns within selected software code and standardized solution prompt sets configured to direct the LLM to generate replacement code that adheres to predefined enterprise standards for those identified patterns. The code modernization system provides a user interface allowing users to select software code from the repository and appropriate prompt sets from the library. It transmits the selected code and pattern recognition prompts to the LLM, receives the identified patterns back from the LLM, transmits the selected standardized solution prompts to the LLM, and ultimately receives the generated standardized replacement code from the LLM.

The pattern recognition prompts and the code standardization prompts are preferably programming language specific, as the nuances, hallmarks and characteristics of the patterns to be recognized will be different for different programming languages. Furthermore, the programming-language-specific nature of the prompts facilitates the use of this standardization process as a key component of programming language translation efforts. The standardized solution prompts direct the LLM to generate replacement code in a target programming language, which may be the original language for in-place standardization, or a different language as part of an enterprise initiative to migrate legacy code. As such, the code standardization process can operate independently or serve as an integral part of modernizing legacy systems through translation, wherein the LLM generates standardized code constructs directly in the target programming language.

By leveraging large language models guided by specialized, curated prompt libraries to recognize inconsistent or legacy code patterns and subsequently generate standardized, enterprise-approved replacement code, various embodiments of the present invention may offer significant potential advantages. For instance, the application of well-tested and documented standardized code generated through this process could lead to improvements in overall code quality. Furthermore, the resulting potential increase in code consistency across enterprise software may enhance maintainability, potentially making software systems easier for development teams to understand, debug, and modify over time.

Additionally, the embedding of standardized security practices within the generated replacement code offers the potential to contribute to enhanced overall system security, possibly by reducing common vulnerabilities associated with inconsistent or outdated coding patterns. The adoption of standardized data formats and communication protocols, facilitated by replacing varied implementations with standardized ones, could also promote better interoperability, potentially enabling more seamless integration between different enterprise systems. Moreover, the standardization of elements related to deployment and monitoring processes might lead to reduced operational costs by potentially simplifying system administration tasks.

In some embodiments, the present invention also includes a structured prompt development lifecycle comprising a "make recipe" phase and a "use recipe" phase. In the make recipe phase, engineered prompt sets and standardized pattern solutions are developed and curated into a centralized prompt library. In the use recipe phase, these curated prompt sets are consumed by the system to modernize legacy code in a repeatable and scalable fashion. This lifecycle supports modular reuse, cross-team collaboration, and consistent output across enterprise modernization efforts.

Additionally, the system may treat prompts and patterns as first-class citizens in the code modernization pipeline, equivalent in importance to source code itself. This elevates prompt design and reuse into structured software engineering practice, rather than informal tooling. Prompts and patterns can be versioned, documented, and governed with the same rigor as source code, enabling standardization across the organization.

In further embodiments, the prompt library is governed under an inner-source collaborative model, where teams across the enterprise contribute, validate, and consume standardized prompt sets. This model, akin to open-source but internal to the organization, fosters continuous improvement and allows domain-specific expertise to be encoded and reused at scale.

These potential benefits, among others described herein, illustrate the possible value realizable through various embodiments of the present invention.

FIGURES

Various embodiments of the present invention are described herein by way of example in connection with the following figures.

Figure 2:
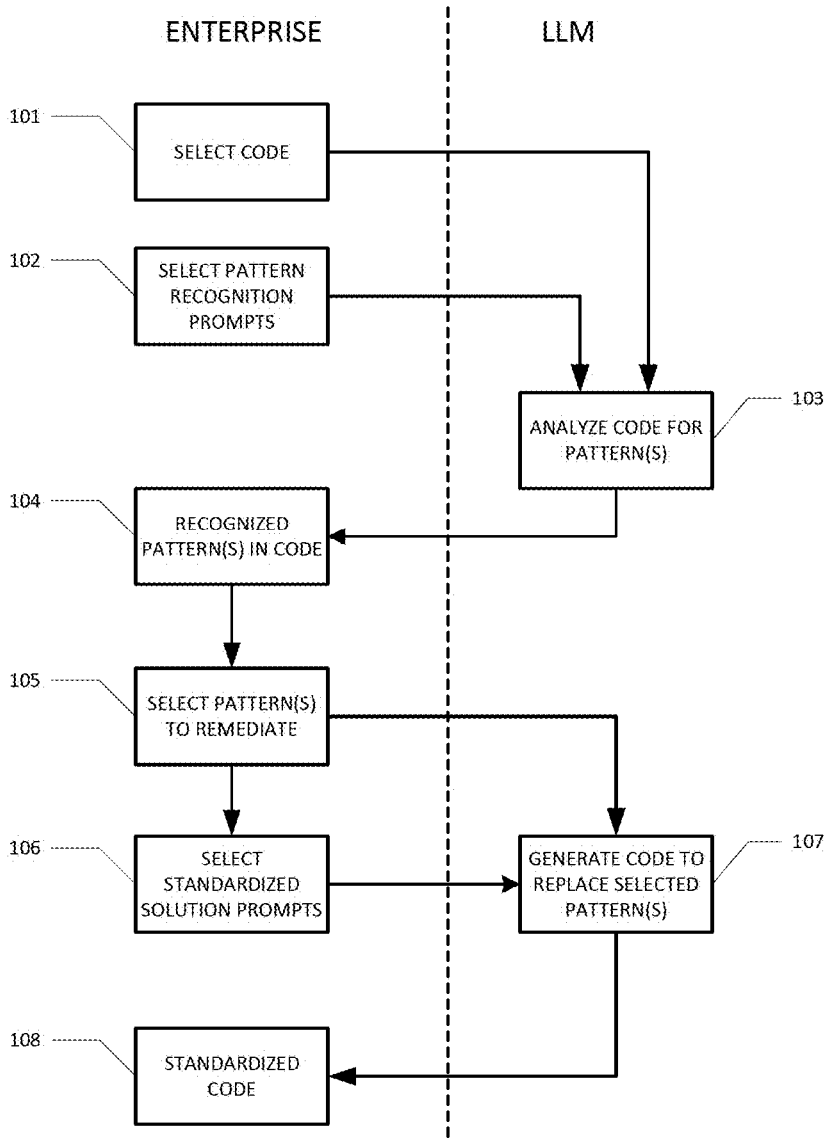
FIG. 2 illustrates a process for recognizing and standardizing, with a LLM, patterns in software code of an enterprise, according to various embodiments of the present invention.
Figure 3:
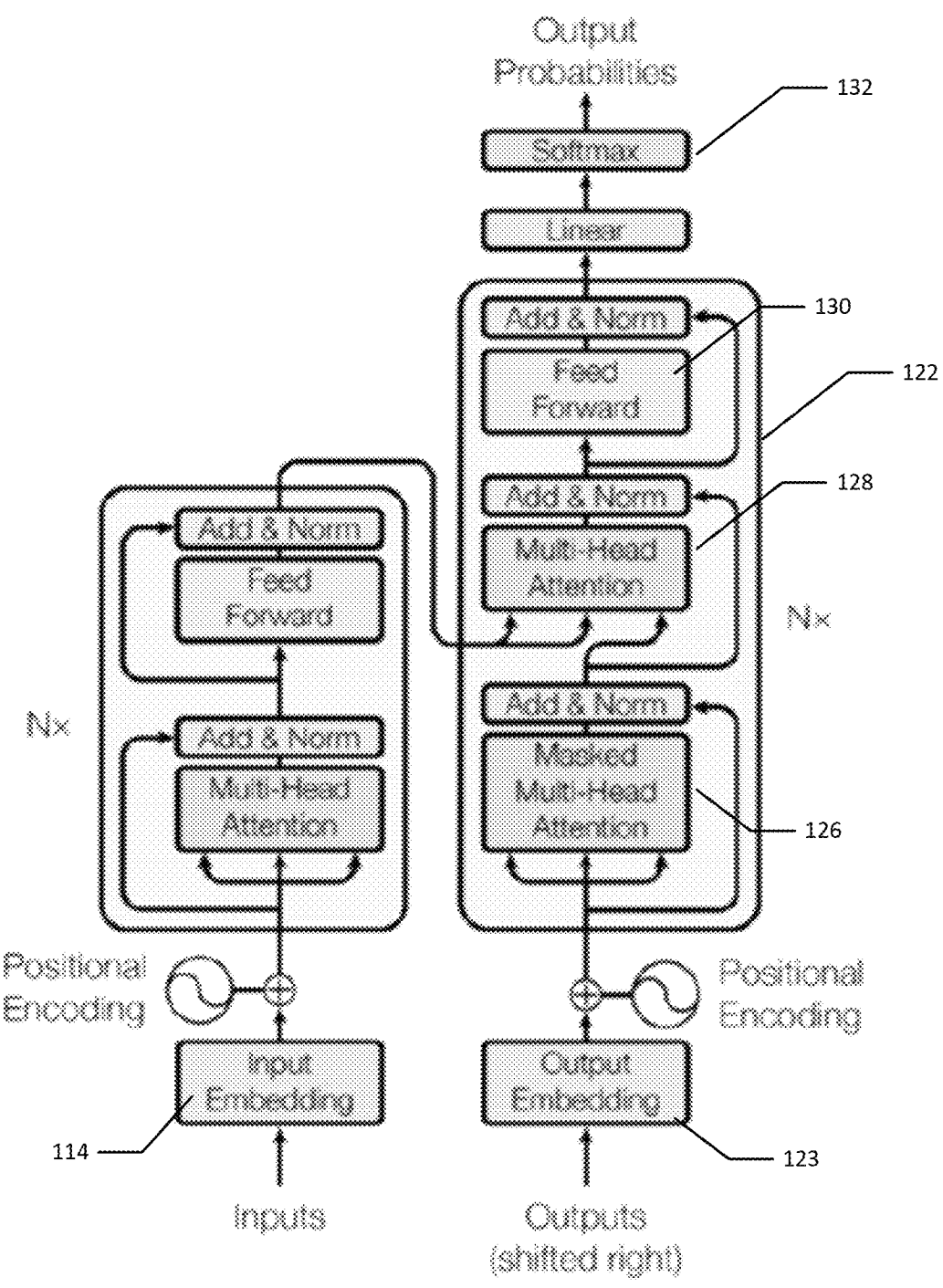

FIG. 3 is a diagram of a transformer that could be used in the LLM of FIG. 2 according to various embodiments of the present invention. The diagram is adapted from A. Vaswani et al., "Attention Is All You Need," Advances in Neural Information Processing Systems 30 (NIPS 2017), arXiv: 1706.03762.

Figure 4:
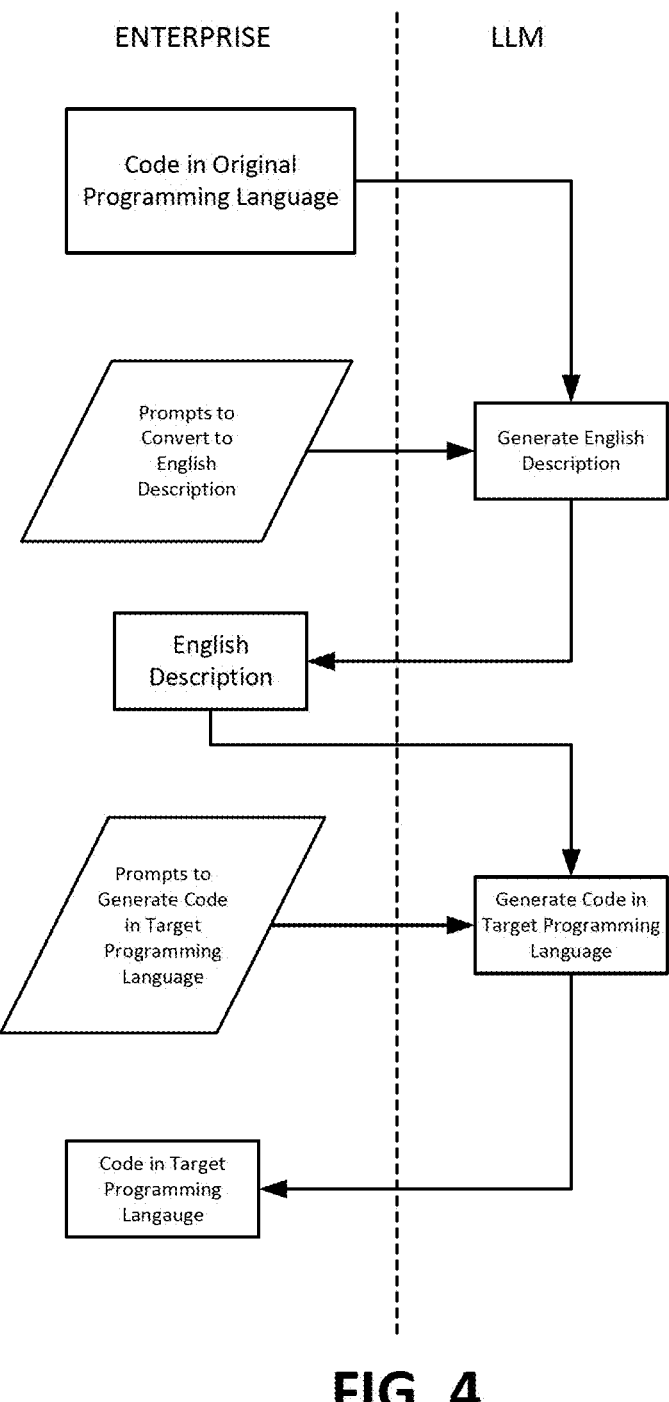
Figure 5:
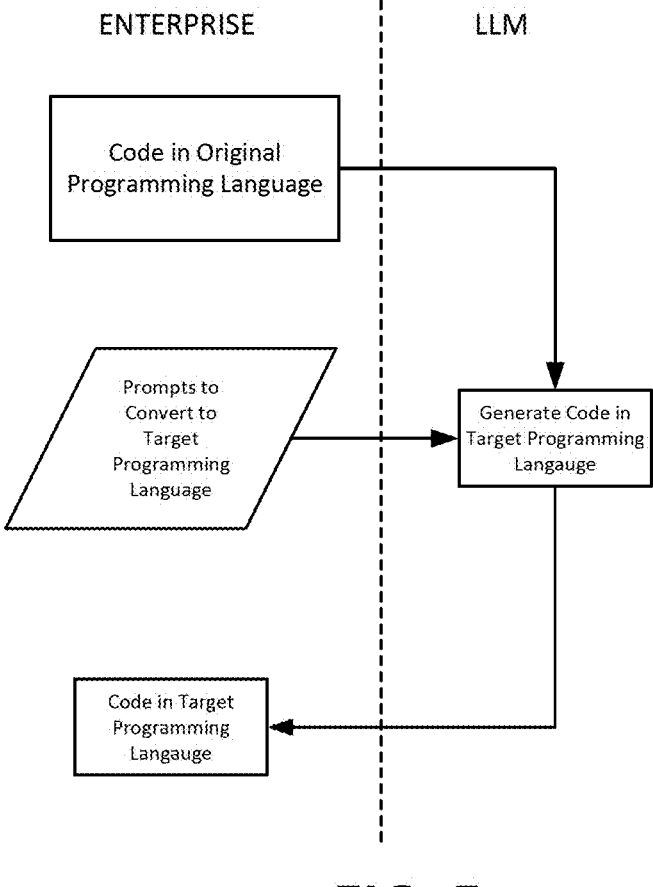

FIGS. 4 and 5 illustrate various processes for converting a program in a first programming language to a programming a second programming language according to various embodiments of the present invention.

Figure 6:
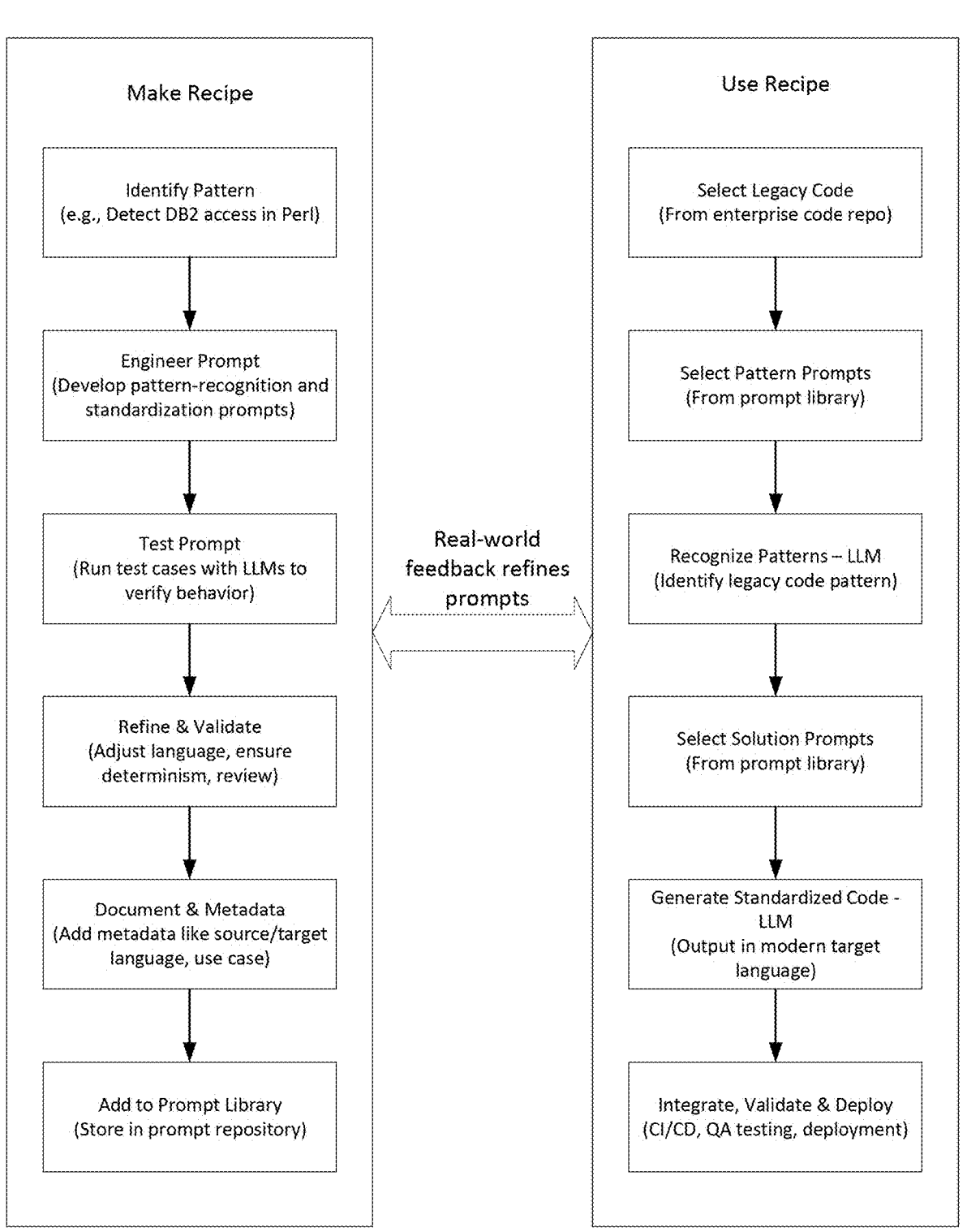

FIG. 6 illustrates a prompt development lifecycle according to various embodiments of the present invention, comprising a Make Recipe phase and a Use Recipe phase. The Make Recipe phase includes engineering, testing, and curation of prompt sets. The Use Recipe phase includes selecting and applying curated prompts from a centralized prompt library to standardize legacy code using a large language model (LLM). This two-phase process promotes reuse, consistency, and collaboration.

DESCRIPTION

Figure 1:
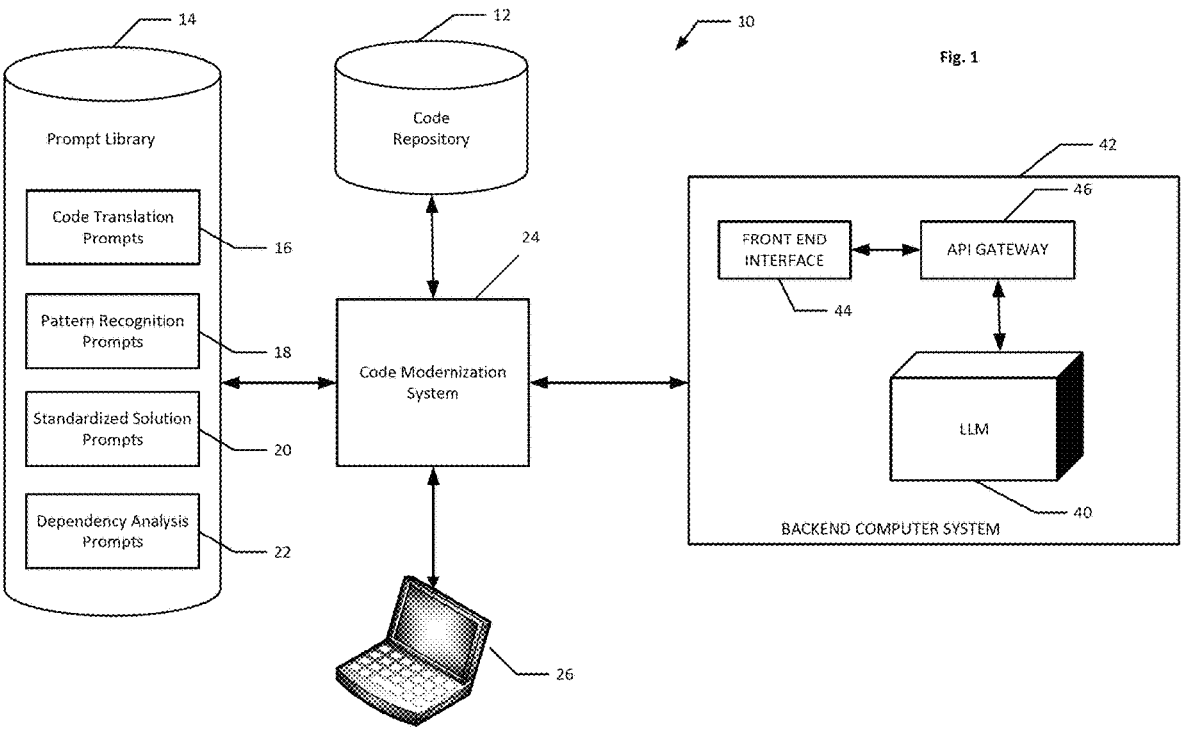
FIG. 1 is a diagram of a system for recognizing and standardizing, with a LLM, patterns in software code of an enterprise according to various embodiments of the present invention.

The present invention is directed, in general aspects to, systems and methods that utilize a customized prompt library to direct an LLM to recognize one or more patterns in legacy code of an enterprise and then, after the LLM recognizes a pattern (n) in the legacy code, again using the prompt library, direct the LLM to generate enterprise-standardized replacement code for any detected patterns. The enterprise-standardized replacement code can be (i) in a different programming language from the legacy code, such as part of an effort by the enterprise to convert the legacy program to another programming language, or (ii) in the same programming language as the legacy code/program, such as part of an effort to standardize its code. The standardized replacement code can be deployed (e.g., after suitable validation and acceptance, if necessary) in production for the enterprise. FIG. 1 illustrates a system 10 in which the present invention may be implemented according to various embodiments of the present invention.

The system 10 of FIG. 1 includes, among other things, a code repository 12 and a prompt library 14. The code repository 12 stores software code used by the software system(s) of the enterprise, which can include code written in different programming languages, such as, for example, SQL, Java, Angular, COBOL, Perl, Python, etc. The prompt library 14 can include multiple sets of prompts categorized, for example, based on use case, such as, for example, code translation prompts 16 (e.g., prompts that direct the LLM to translate a program in the code repository to another language), pattern recognition prompts 18 (e.g., prompts that direct the LLM to recognize particular pattern(s) in the code that is suitable for a standardized solution), standardized solution prompts 20 (prompts that direct the LLM to generate standardized replacement code for the recognized pattern), and/or dependency analysis prompts 22 (prompts that direct the LLM to generate a dependency analysis for a software system of the enterprise). More details about the prompts 16, 18, 20, 22 are described below. The code repository 12 may comprise a Git repository, for example, using a content-addressable file system, e.g., objects (files, directories, commits) are stored and retrieved based on their content, using cryptographic hash functions. The prompt library 14 could be implemented with a database (e.g., PostgreSQL, MySQL, MongoDB).

The illustrated system 10 also comprises a code modernization system 24 that provides an interface between the code repository 12, the prompt library 14, a back-end computer system 42 that comprises a generative AI LLM 40, and a user device 26. The code repository 12, the prompt library 14, the code modernization server system 24, and the user device 26 may be connected via, and part of, a computer network of the enterprise. The code modernization system 24 may comprise one or more servers, and may be in communication with the back-end computer system 42 via an electronic data network such as the Internet. The LLM 40 could be, for example, one of OpenAI's GPT series of models (e.g., GPT-3.5, GPT-4, GPT-4 Turbo and GPT-4O used in ChatGPT), BERT (Bidirectional Encoder Representations from Transformers), ROBERTa (A Robustly Optimized BERT Pretraining Approach), PaLM (Pathways Language Model) and Gemini (Gemini AI 1.5 or 1.0 models), or some other suitable LLM. FIG. 3, described further below, provides more details about an example structure for the LLM 40. The code modernization system 24 may communicate with the LLM 40 via a front-end interface 44 that interacts with the LLM 40 via an API gateway 46, for example. As explained further herein, an end-user, via the user computer device 26, can select, via a user interface provided by the code modernization system 24, programs/code in the code repository 12 for the LLM 40 to analyze and prompts in the prompt library 14 to direct the LLM's analysis of the selected programs/code. The user interface through which the user selects the code and prompts can be, for example, a web application, a mobile app, a chat widget embedded in a website, or a desktop application, for example. In that connection, the code modernization system 24 may comprise a web server or application server for hosting the user interface.

Details about suitable and exemplary code translation prompts 16 are described in U.S. patent application Ser. No. 18/787,750, filed Jul. 29, 2024, titled "Generating New Software Code from Legacy Software Code Using Large Language Models," which is incorporated herein by reference in its entirety. As described in this incorporated patent application, the code translation process can be conducted in two general different ways. In a first general way, as shown in FIG. 4, the code translation prompts 18 can direct the LLM to (1) generate a human language (e.g., English) description of a selected program in the code database, which is written in a first (or original) programming language (e.g., Perl) and then (2), after validation of the human-language description, generate a program/code in a target programming language (e.g., Python or Java) from the human-language description. In a second general way, as shown in FIG. 5, the code translation prompts 16 can direct the LLM 40 to generate the program/code in the target programming language directly from the selected program in the original programming language (e.g., convert a Perl program directly to Java or Python). After validation and testing, the enterprise can put the code/program in the target programming language into production.

More details about suitable and exemplary dependency analysis prompts 22 are described in U.S. patent application Ser. No. 19/080,275, filed Mar. 14, 2025, titled "Multi-Language Program and Data Flow Analysis Using LLM," which is incorporated herein by reference in its entirety. Such dependency analysis prompts 22 can be specific to the programming languages of the programs in the software system being analysis. The prompts 22 can direct the LLM to extract functional components from the software codebase for the application-such as UI elements, functions, web services, stored procedures, and database tables-regardless of the programming languages in which they are written. The programming-language-specific prompts also direct the LLM to process the source code to generate labeled graph nodes, each representing a distinct software component, from which a directed graph can be constructed.

The pattern recognition prompts 18 direct the LLM 40 to recognize one or more particular patterns in a selected program in the code repository 14, and the standardized solution prompts 20 can direct the LLM 40 to generate (e.g., draft) new (or replacement) code to standardize across the enterprise code for the recognized patterns. The replacement, standardized code can be in a different programming language (i.e., the "target" programming language) and the originally selected, legacy program, such as part of an effort by the enterprise to convert the legacy program to another programming language. Alternatively, the replacement, standardized code could be in the same language as the originally selected, legacy program. In that sense, the pattern recognition prompts 18 and the standardized solution prompts 20 are preferably programming language specific as, with respect to pattern recognition, the patterns will appear differently for different programming languages; and the standardized solution prompts 20 should direct the LLM to generate the replacement, standardized code in the desired programming language (e.g., different from or the same as the selected program). Programming languages have distinct syntax (how code is written) and semantics (the meaning of the code). Also, each programming language has its own ecosystem of libraries and frameworks. As such, a pattern in Python might look drastically different from the same pattern in Java or C++. Both the programming language prompt recognition prompts 18 and the standardized solution prompts 20 are preferably generated in manners that are cognizant of the varying nuances involved with different programming languages.

FIG. 2 illustrates an exemplary process according to various embodiments of the preset invention for recognizing and standardizing code patterns. At step 101, a user (e.g., from user device 26) selects (and uploads) a piece of code or program from the code repository 12 for the LLM 40 to analyze. The selection at step 101 may be part of a process to convert the selected code/program from first (e.g., programming language) to a second, target programming language. Alternatively, the selection at step 101 may be part of a process to merely standardize the programming in the selected program, without changing its programming language.

At step 102, the user selects a set of pattern recognition prompts 18 from the prompt library 14, where the selected prompts direct the LLM's analysis of the code selected at step 101. Again, the selection of pattern recognition prompts 18 may be in conjunction with a selection of code translation prompts 16, such as part of a program to translate legacy code in the prompt library 14 to another/target programming language.

The prompt library 14 may include various sets of pattern recognition prompts 18 that direct the LLM to recognize specific patterns in the code/program selected at step 101. One example of a pattern to be recognized is code for accessing a database(s) employed by the enterprise, such as a relational database(s) (e.g., DB2, Sybase), a massively parallel processing database (e.g., Greenplum), a relational time-series database (e.g., kdb+), and/or a cloud-based database (e.g., Snowflake). Other examples of patterns that could be recognized by the LLM 40 via direction from the pattern recognition prompts 18 include calls to various enterprise IT services used by the enterprise, such as messaging services (e.g., IBM-MQ), a security monitoring service, an event streaming service (e.g., CPS), and/or an event management service/alerting service (e.g., Netcool and/or WatchTower). Still further examples are described below.

The sets of pattern recognition prompts are also preferably programming language specific so that the user can select a prompt set corresponding to the programing language of the code/program selected at step 101. The various programming languages could be, for example, Python, Java, Perl, Cobol, etc. As such, for example, there could be: multiple prompt sets for recognizing calls to a DB2 database, each for a different programming language; multiple prompt sets for recognizing calls to a Sybase database, each for a different programming language; multiple prompt sets for recognizing calls to a MQ messaging queue, each for a different programming language; and so on. The user can, therefore, select one or more pattern recognition patterns for a selected program (selected at step 101), and the selected pattern recognition prompts can be specific to the language of the selected program. For example, if the program selected at step 101 is written in Perl and the user wants to recognize access to IBM-MQ, at step 102, the user could select a Perl-specific prompt set for recognizing a pattern associated with accessing IBM-MQ, and so on.

Note that at step 102, the user could select multiple prompts if, for example, the user desires the LLM 40 to examine the code for various different patterns (e.g., accessing different databases, etc.)

Based on the code selected at step 101 and being directed by the prompt set(s) selected at step 102, the LLM 40, at step 103, analyzes the code for the pattern(s) corresponding to the selected prompts, where the LLM's analysis is directed by the selected prompt set(s). At step 104, the LLM 40 transmits the recognized pattern(s) in the code back to the user. The recognized pattern(s) can be displayed by the user interface provided by the code modernization system 24, for example. At step 105, the user can then select the recognized patterns for which the user desires the LLM 40 to generate new (or updated or replacement) code. The user could select all of the patterns recognized by the LLM at step 104 or a subset of them, for example. The user also selects, at step 106, via the user interface provided by the code modernization system 24, a prompt set for a standardized solution 20 from the prompt library 14 for each of the patterns selected at step 105. The standardized solution prompts 20 may include, for example, prompts that direct the LLM 40 to generate code standardized for the enterprise to address each of the patterns recognized at step 105. For example, there could be standardized solution prompts for accessing message queues, accessing various databases, etc. Also, the standardized solution prompts are preferably language specific so that the LLM 40 is directed to generate the standardized replacement code in the desired/target programming language. Different programming languages have different syntaxes, standard libraries, built-in functions, frameworks and ecosystems, programming paradigms, memory management, typing systems, etc. To account for these nuances, the standardized solution prompts 20 preferably direct the LLM to generate the standardized code in a specific, target programming language.

Based on the pattern(s) selected at step 105 and the standardized solution prompts 20 selected at step 106, the LLM 40, at step 107, generates code, as directed by the selected prompts, to replace the code in the program associated with the selected pattern(s). For example, if the pattern is accessing a Sybase database, and the replacement code is to be written in Python, the LLM 40 at step 107, as directed by the prompts, generates Python code that accesses the Sybase database. And because the prompts direct the LLM 40 to generate the code according to a standardized, curated solution for the enterprise, the code that the LLM 40 generates will likely conform to the enterprise's standardized solution.

The LLM 40 can generate the replacement/updated code for each pattern selected at step 105. At step 108 the LLM 40 transmits the standardized code for each pattern back to the user via the code modernization system 24. The enterprise can then, at step 109, include the replacement code in the new, modernized program (which could include a programming-language-translation of the original program or a same-language update to the original program), with the standardized code for use in production purposes by the enterprise (preferably after suitable validation, testing, etc.

of the replacement code). For example, prior to use of the standardized code in production, unit and parallel tests can be run on the new standardized code to verify its functionality and reliability. A Continuous Integration/Continuous Deployment (CI/CD) pipeline may also be updated to accommodate the new script and ensure seamless workflow transition. If the new standardized code passes the applicable tests, and following a successful code review and approval process, the new script can be merged into the original program for production/deployment. This phase can ensure that the newly deployed script(s) operates effectively within the existing system architecture and meets all predefined functional and performance criteria. In various embodiments, different teams within the enterprise can be tasked with (i) generating and testing the standardized code, and (ii) final approval and deployment of the standardized code.

In some embodiments, the prompt library 14 is organized and managed through a structured prompt lifecycle that includes a "Make Recipe" cycle and a "Use Recipe" cycle, such as shown in FIG. 6. The Make Recipe cycle involves engineering, testing, and refining prompt sets and standardized pattern templates. This phase allows prompt engineers to identify recurring legacy code patterns-such as database access, messaging interfaces, or logging routines- and encode consistent solutions for these patterns as prompts. The Use Recipe cycle involves consuming the curated prompts from the prompt library 14 to solve new instances of the same pattern. By separating prompt engineering from application, the system enables repeatability, scalability, and reliable modernization outcomes. Furthermore, the system may treat prompt sets and standardized patterns as first-class citizens, enabling them to be version-controlled, peer-reviewed, and integrated into CI/CD pipelines. The prompt library may include metadata, documentation, and categorization mechanisms that allow users to search and reuse prompts for specific languages, systems, or modernization goals. In one embodiment, the prompt library is governed using an inner-source collaborative model. Teams from across the enterprise contribute prompt sets and pattern definitions, which are then validated and made available for reuse by other teams. This decentralized, community-driven model promotes knowledge sharing, consistency, and rapid scaling of modernization capabilities across the organization.

FIGS. 2, 4 and 5 suggest that the LLM 40 is separate from the enterprise's network. However, the LLM 40 could be part of the enterprise's network (e.g., a private LLM, on-prem LLM, or proprietary LLM). Such a proprietary LLM could be hosted and used within a private environment (e.g., an enterprise's internal systems). It may be trained on proprietary data of the enterprise for exclusive use by the enterprise. Such a proprietary LLM is generally not accessible to the public. Alternatively, the LLM 40 could be a public, open, cloud or consumer LLM that is available for broad public use, either freely or through a paid API/subscription. Such a public LLM may be hosed by a company (e.g., OpenAI's GPT models, Google's Gemini, Meta's Llama on cloud). The LLM 40 could also be a hybrid LLM, e.g., partially open, allowing external users to fine-tune or interact with it while keeping its core architecture or certain features proprietary. A hybrid LLM approach enables enterprises to leverage a powerful base model while customizing it for specific needs without exposing the enterprise's sensitive data.

The system could be used to recognize and correspondingly standardize many different types of code patterns that an enterprise might have in its code, such as connecting to a database, such as a relational database (e.g., DB2, Sybase, MSSQL), a massively parallel processing database (e.g., Greenplum), a relational time-series database (kdb+) and/or a cloud-based database (e.g., Snowflake). The patterns could also be calls to an enterprise IT service, such as call with a messaging service/queue (e.g., IBM-MQ), a security monitoring service, an event management service/alerting service (e.g., Netcool and/or WatchTower), and/or an event streaming service (e.g., CPS). Still other types of patterns that could be recognized (and remediated) include SOAP requests and responses; REST APIs; connecting to various computer systems of the enterprise; establishing secure web connections with cookie handling and SSL verification; argument parsing; Kerberos authentication; sending emails; and/or LDAP connections.

The pattern recognition prompts 18 for the various patterns can be drafted, created and/or curated by the enterprise using, for example, contextual information of the enterprise. That is, for example, in addition to general strings and commands associated with a particular type of pattern and/or programming language, the pattern recognition prompts 18 might include metadata or other enterprise-related contextual information so that the LLM 40 is directed to recognize the patterns in the code based on such metadata or enterprise-related contextual information. For example, in the case of connecting to a database, the enterprise might have a specifically named module that is imported into the code. The pattern recognition prompts 18 for this pattern might direct the LLM 40 to recognize the pattern by looking for code that imports the specifically named module or connection strings that use the specific name of the module. The pattern recognition prompts 18 may also direct the LLM 40 to identify a database-access pattern by identifying initialization of database handles, execution of SQL queries, handing of query results, and/or management of database connection errors or database execution errors. Again, the pattern recognition prompts 18 are preferably programming language specific (such as identification of connection to a certain type of database in a Perl program) because programs in different programming languages will have different hallmarks or characteristics recognizable by the LLM.

The standardized solution prompts 20 are also preferably programming language specific (e.g., standardized Python code for connected to a certain type of database) and are also preferably drafted, created, and/or curated for the enterprise so that they are specific to the enterprise, such as by referring to specific modules or systems of the enterprise by name, etc. For example, the standardized solution prompts 20 for the various patterns might include specific commands for installing packages in various programming languages, particular modules that should be imported, particular code templates, etc.

As an example, a prompt set for identifying connection to a DB2 database in a Perl module could include the following:

```
Here is how to detect this pattern:
Module imports: DBI + DBD::DB2/DBD::ABCDB2
Connection string: "dbi:DB2:database=X;hostname=Y;port=Z"
Standard DBI methods: connect( ), prepare( ), execute( )
Error handling: $DBI::errstr or $sth->errstr
Example:
'''
use DBI;
$dbh = DBI->connect("dbi:DB2:database=$db;hostname=$host",
$user, $pass);
$sth = $dbh->prepare($sql)->execute( ) or die $DBI::errstr;
'''
```

This prompt set includes module imports (DBI and DBD::DB2), which are standard for DB2 database connections in Perl. It also includes a connection string pattern, "dbi:DB2:database=X; hostname=Y; port=Z," which is a general structure for connecting to DB2. It also includes standard DBI methods, like connect ( ) prepare ( ) and execute ( ) and standard Perl DBI error-handling techniques, such as $DBI::errstr and $sth->errstr.

Below is an example of a code standardization prompt set to generate replacement code in Python for connecting to the DB2 database:

```
"Here is an example of how to write the Python equivalent:
# Instructions for the developer - include these in the code
# pip install ibm-db==3.2.2+client11.5.9.1
# pip install abc-python-db2
# pip install abc-python-modulecmd
import abc.modulecmd
abc.modulecmd.load(""ibmdb2/client/11.5.9.1""")
import ibm_db
import abc.db2
import subprocess
def get_db2_db_connection(server):
    try:
        conn = abc.db2.connect(db2_server, conn_options={
ibm_db.SQL_ATTR_AUTOCOMMIT : ibm_db.SQL_AUTOCOMMIT_ON })
    except Exceptions as e:
        print(f""""Failed to connect to the database: {e}""""")
        return None
    return conn
def run_read_query(conn, query):
        cursor = conn.cursor( )
        cursor.execute(query, parameters=[ ])
        for row in cursor.fetchall( ):
            print(row)
def run_update_query(conn, sql):
    cursor = conn.cursor( )
    cursor.execute(sql)
    conn.commit( )
def close_connection(conn):
        conn.close( )
```

-continued

```
def upload_to_db_from_text_file(server_name, table_name, input_text_file_path):
    try:
        db1_command = f"""db3 connect to {server_name}"""
        subprocess.run(db1_command, shell=True, capture_output=True, text=True)
    db2_command = fdb2 import from {input_text_file_path} of del modified by
"""coldel|""" insert into {table_name}'
        result = subprocess.run(db2_command, shell=True, capture_output=True, text=True)
        if result.returncode == 0:
            print("""Data loaded successfully into DB2 table""")
            print(result.stdout)
        else:
            print(f"""Failed to load data into DB2 table: {result.stderr}""")
    except Exception as e:
        print(f"""Exception occurred while loading data into DB2 table: {e}""")
    # Usage
    SERVER = """DATABASE_SERVER"""
    SELECT_QUERY = """SELECT * FROM DUMMY_TABLE"""
    UPDATE_QUERY = """INSERT INTO DUMMY_TABLE VALUES ('ABC', '123')
    TEXT_FILE = """data.txt"
    TABLE NAME = """DUMMY_TABLE"""
    conn = get_db2_db_connection(SERVER)
    run_read_query(conn, SELECT_QUERY)
    run_update_query(conn, UPDATE_QUERY)
    upload_to_db_from_text_file(SERVER, TABLE_NAME, TEXT_FILE)
    close_connection(conn)
    "
```

Still other types of code patterns that could be recognized and standardized include code for: logging (e.g., standardized logging libraries and formats, including defining log levels, output destinations, and formatting conventions); error handling (implementing consistent error handling patterns (e.g., exception classes, error codes) to make it easier to diagnose and recover from failures); configuration management (standardizing how applications read and manage configuration settings (e.g., using a common configuration file format or service)); date/time handling (ensuring consistent date/time formatting and time zone handling); string manipulation (standardized string utility functions (e.g., for validation, formatting, and encoding)); mathematical operations (for applications involving complex calculations, standardizing math libraries); input validation (standardizing input validation routines (e.g., for data types, ranges, and formats)); security (encryption and decryption routines; authentication and authorization mechanisms; secure storage of credentials); networking (standardizing how HTTP requests and other network communications are handled, such as retry logic, timeouts, and error handling); file I/O (standardizing how files are read and written); data serialization/deserialization (standardizing data serialization/deserialization formats, e.g., JSON, XML, Protocol Buffers); API Design; Dependency Injection: Testing Frameworks (standardizing on a testing framework (e.g., JUnit, pytest) and testing practices); code style and formatting (enforcing a consistent code style (e.g., using a linter and formatter)); deployment procedures; containerization (standardizing container usage, such as docker files, and container orchestration); data access layers (standardizing the patterns used to access data, and the objects that move data); asynchronous processing (standardizing how asynchronous operations are handled).

By standardizing these areas, an enterprise can achieve several benefits, such as: the curated patterns can be vetted by experienced coders in the organization for each language, thereby propagating optimal coding standards without making these few experts a bottleneck in the code review process; improved code quality (the standardized code can be well-tested and documented); increased maintainability (consistent code is easier to understand and modify); enhanced security (standardized security practices help prevent vulnerabilities); better interoperability (standardized data formats and communication protocols enable seamless integration between different systems); and/or reduced operational costs (standardized deployments and monitoring simplify system administration). Other benefits include that a general purpose, public LLM could be used. Still further, embodiments of the present invention reduce the criticality of an enterprise having programming experts in all of the various programming languages across the enterprise. Instead, so long as the prompts are appropriately precise, constrained and complete, the LLM 40 will generate near or practically uniform standardized code from one session to the next. To that end, the code standardization prompts 20 preferably: (1) specify the programming language; (2) be explicit about scope; (3) control style and structure; (4) anchor with examples; (5) use deterministic language; (6) provide a template or skeleton; and (7) pin to a version or spec (e.g. "Python 3.10 and compliant with PEP8"). In addition, the standardized solution prompts could specify a value for the determinism hyperparameter (typically called "temperature") that controls the level of determinism in the LLM's responses. For example, the standardized solution prompts could specify a value of zero (0) for the temperature that makes the LLM 40 as deterministic as possible.

The enterprise can add pattern recognition and standardized solution prompts to the prompt library 14 continually, in an ongoing matter, as the enterprise identifies new patterns that need modernized/standardized. In that sense, the prompts can have a multi-stage development life cycle. For example, first a set of prompts can be generated and curated in the prompt library. Then, secondly, the set of prompts can be consumed from the prompt library by the LLM to standardize/modernize the code. The two-phase approach enables an enterprise to work with external vendors without sacrificing autonomy or flexibility. Prompt sets (or "recipes") created during the first phase can be to be vendor tool-agnostic. This vendor-agnostic integration can help the enterprise benefit from external innovations while maintaining ownership of its code modernization efforts. The prompt sets/recipes also provide the advantage of built-in mechanisms for ensuring consistency and quality across the enterprise's code modernization efforts.

The inclusion of a prompt development lifecycle and the treatment of prompt sets and patterns as first-class engineering artifacts improves consistency, reduces rework, and supports organizational scaling. By using an inner-source model for prompt library governance, the system captures and disseminates best practices, even across large, distributed teams. This also enables knowledge retention when experienced developers transition out of legacy system domains, as their expertise is encoded into standardized prompts and reusable patterns.

The example of FIG. 3 shows a transformer based LLM model, which is a type of neural network architecture designed for natural language processing (NLP) tasks and which could be used for the LLM 14. The key components of a transformer model include an encoder-decoder architecture, a self-attenuation mechanism, a feed-forward neural network (FFNN), positional encoding, and layer normalization and residual connections. Tokens are the basic units of input that a transformer network, such as the transformer network of FIG. 8, processes. They can represent words, subwords, characters, or other elements, depending on the tokenization method used. Tokens are discrete elements that the model uses to understand and generate text. They are numerical representations of the textual data that the model processes. Tokens come from a process called tokenization, which converts raw text into a sequence of tokens. After tokenization, tokens are usually converted into numerical representations (token IDs) that the model can process. This is done using a vocabulary, which maps each token to a unique integer. These token IDs are then transformed into dense vectors (embeddings) that capture semantic information. Embeddings are high-dimensional representations where tokens with similar meanings are located close to each other in the vector space.

The encoder 112 can take an input sequence and transforms it into a sequence of continuous representations. An input embedding layer 114 can convert words or tokens into dense vectors of fixed size. Positional encoding 116 can add information about the position of each token in the sequence since the model does not inherently understand order. These encodings are added to the input embeddings. A self-attention mechanism 118 allows the model to focus on different parts of the input sequence when encoding a particular token. It calculates a weighted sum of the input values, where the weights are determined by the similarity between the token being processed and other tokens in the sequence. A feed-forward neural network (FFNN) 120 can apply a two-layer fully connected network to the output of the self-attention mechanism. Each sub-layer (e.g., self-attention and FFNN) is followed by a residual connection (adding the input of the sub-layer to its output) and layer normalization to stabilize and speed up training.

The decoder 122 takes the encoder's output and generates the output sequence, one token at a time. Similar to the encoder, an output embedding layer 123 and positional encoding 124 converts output tokens into dense vectors and adds positional information. A masked self-attention mechanism 126 ensures that the prediction for a particular token depends only on the known outputs up to that position (i.e., the model cannot "cheat" by looking ahead). An encoder-decoder attention layer 128 allows the decoder to focus on relevant parts of the input sequence (the encoder's output) when generating each token of the output sequence. An output/decoder feed-forward neural network (FFNN) 130, similar to the encoder FFNN 120, applies a two-layer fully connected network to the output of the attention mechanism 128. Residual connections and layer normalization can be applied in the same manner as in the encoder.

Encodings in the transformer refer to the representations of tokens at various stages. The input embeddings comprise initial dense vector representations of the input tokens. The positional encodings are added to input embeddings to incorporate position information. Contextualized encodings are the representations produced by the self-attention and FFNN layers, which capture the context of each token in the sequence.

Attention allows the model to focus on different parts of the sequence when processing a token. It can involve Query (Q), Key (K), and Value (V) matrices that are derived from the input embeddings by multiplying them with learned weight matrices. Scaled dot-product attention can calculate attention scores by taking the dot product of the Query and Key matrices, scaling them down, and applying a softmax function to get the attention weights. These weights are then used to compute a weighted sum of the Value matrix, producing the attention output.

The softmax function 132 can covert the attention scores into probabilities, ensuring that they sum to one. In the context of attention, the softmax function 132 ensures that the attention weights highlight the most relevant tokens while maintaining a probabilistic interpretation.

The LLM 40 could also be adapted for a particular domain or context, such as a domain(s) specific to the enterprise, via fine tuning of the LLM 40, which adjusts the pre-trained LLM's weights using domain-specific data to make it more effective for particular applications. Fine tuning can involve collecting a large and diverse dataset relevant to the specific domain or context. For example, for a financial services application, materials describing the financial services and/or the products of the financial services could be used. This adaptation training data can be tokenized into smaller units (tokens) that the LLM 40 can process. The tokenization of the adaptation training data can use the same tokenization method as the base model of the LLM 40. The fine-tuning process can involve supervised fine-tuning (e.g. labeled data) where possible. The model is then trained on the domain-specific data, typically under supervised learning techniques. Fine-tuning can be done using frameworks like Hugging Face's Transformers library, TensorFlow, or PyTorch. The fine tuning can involve conventional hyperparameter adjustments and validation of the model's performance.

The LLM can generate text (e.g., code in the target programming language) using a sophisticated next-word prediction mechanism. The model can be trained on a vast dataset of text from various sources. During training, it learns patterns, structures, and the statistical relationships between words and phrases in the text. This training process involves adjusting the model's parameters to minimize the error in predicting the next word in a sequence of text. When given a prompt and/or initial text, the model analyzes the context using its learned patterns. It takes into account the words and phrases that have already been provided to understand the context and meaning. Based on the context, the model generates a probability distribution over the potential next words. It uses this distribution to predict the most likely next word. This process is repeated word by word to generate coherent and contextually relevant text (e.g., software code). The model can use different strategies to choose the next word from the probability distribution. Common strategies include greedy sampling (choosing the word with the highest probability), top-k sampling (limiting the choices to the top k most probable words and sampling from them), top-p (nucleus) sampling (choosing words from the smallest set whose cumulative probability exceeds a certain threshold (p)), and/or temperature (adjusting the randomness of the predictions, where a lower temperature makes the model more conservative, while a higher temperature makes it more creative and diverse). The model repeats the process, using the newly generated word as part of the context for predicting the next word, continuing this until the desired length of text is generated or until it encounters a stopping condition (like a specific token indicating the end).

The LLM 40 could be tailored to the domain of the enterprise. For example, the enterprise could be a financial services firm and the LLM's could be tailored to the domain of financial products or some other suitable domain(s). To tailor the LLM to the domain of the enterprise, the model must be adapted to understand the enterprise's specialized terminology, workflows, regulations, and data structures. This process involves training and fine-tuning the model using domain-specific data, ensuring that it can generate insights, answer questions, and assist in decision-making with a high degree of accuracy and relevance. This process can involve the step of data collection and preprocessing, in which the enterprise gathers extensive datasets, including, in the example of a financial services firm, financial reports, regulatory filings, transaction records, market data, internal policies, and customer interactions. These datasets can be cleaned, formatted, and tokenized to be compatible with the LLM's training framework. If the enterprise handles sensitive financial data, privacy-preserving techniques, such as differential privacy and data anonymization, may be applied to protect confidential information.

Once the data is prepared, the enterprise can proceed with fine-tuning the LLM to incorporate industry-specific knowledge. Fine-tuning can involve training the model on labeled datasets where the expected outputs are known, enabling the model to improve its performance in particular enterprise-specific applications. This process typically uses deep learning frameworks such as TensorFlow or PyTorch and optimization algorithms like AdamW to adjust the model's parameters. The fine-tuning stage helps the LLM understand jargon of the enterprise, interpret complex documents, and generate responses that align with industry practices. To further improve performance, the enterprise could integrate retrieval-augmented generation (RAG) techniques, where the LLM retrieves and references external financial data sources in real-time. This allows the model to incorporate up-to-date information, regulatory changes, or company reports into its responses, improving accuracy and reducing outdated or incorrect outputs.

In one general aspect, therefore, the present invention is directed to computer-implemented systems and method for standardizing code patterns within an enterprise software environment. The system, in various embodiments, includes a code repository that stores enterprise software code, and a prompt library that contains multiple prompt sets. These prompt sets include pattern recognition prompts used to direct a large language model (LLM) to identify specific code patterns in the software code, and standardized solution prompts used to direct the LLM to generate replacement code that conforms to an enterprise coding standard. A code modernization system is in communication with the LLM and presents a user interface that allows a user to select code and select prompt sets. The system transmits the selected code and pattern recognition prompts to the LLM, receives from the LLM one or more identified patterns in the code, and then transmits standardized solution prompts to the LLM to generate standardized replacement code for the recognized patterns. The replacement code is received from the LLM and may be used to update or modernize the selected program.

A computer-implemented method according to various embodiments of the present invention involves transmitting software code and selected pattern recognition prompts from a code modernization system to a large language model (LLM). The selected software code originates from a code repository and contains enterprise-specific software code. The pattern recognition prompts guide the LLM in identifying specific patterns within the code. Once the patterns are identified, the method continues by transmitting standardized solution prompts to the LLM. These prompts instruct the LLM to generate replacement code that conforms to enterprise coding standards for the recognized patterns. The code modernization system receives the standardized replacement code from the LLM for further use.

In various implementations, the pattern recognition prompts and standardized solution prompts may be specific to particular programming languages. For example, the system may use pattern recognition prompts tailored to a first programming language (such as Perl) and standardized solution prompts targeting a second, different programming language (such as Python), to assist in code translation efforts. In other examples, both types of prompt sets are tailored to the same language, to support in-place code standardization.

In some cases, the specific code patterns include database access patterns that are characteristic of particular programming languages. These database patterns may relate to different types of databases, including relational databases, relational time-series databases, massively parallel processing relational databases, or cloud-based databases. The system may also be configured to identify and standardize code that calls enterprise IT services, such as messaging queues, security monitoring services, event management services, or event streaming services.

In other implementations, the recognized code patterns may include patterns for SOAP requests, RESTful API interactions, file handling, logging, error handling, configuration management, security-related functions, or network communications. These code features are common targets for enterprise-wide standardization and modernization.

In some embodiments, the pattern recognition prompts may incorporate enterprise-specific contextual information, such as the names of internal modules or standardized connection strings, to help the LLM more precisely recognize enterprise-relevant code patterns. Correspondingly, the standardized solution prompts may direct the LLM to generate replacement code that includes enterprise-specific elements such as named modules or system identifiers, ensuring that the resulting code is aligned with internal conventions.

In further examples, the LLM used by the system may be a public model accessed via an external API, allowing the enterprise to leverage publicly available generative models while retaining control over prompt design and code validation.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for standardizing code patterns within an enterprise software environment, the system comprising:

an orchestration system running on a first computer system;

a code repository configured to store enterprise software code, wherein the enterprise software code comprises programming-language-specific code patterns and wherein the code repository is in communication with the first computer system;

a prompt library storing a plurality of engineered prompt sets, including pattern recognition prompt sets and standardized solution prompt sets; and a second computer system executing a large language model (LLM), such that the LLM of the second computer system is in communication with the code repository and the prompt library via the first computer system and an electronic data network, wherein communication between the first computer system and the LLM comprises invoking the LLM via an authenticated application programming interface (API), wherein:

the prompt library is in communication with the first computer system; and the pattern recognition prompt sets and the standardized solution prompt sets are:

programming-language specific;

have a defined structure including prompt templates and metadata;

direct the LLM to perform pattern recognition and standardized-solution replacement according to structured prompt templates; and impose generation constraints including programming-language-specific templates and deterministic generation parameters, thereby controlling and improving consistency and reliability of output of the LLM;

the orchestration system is configured to mediate access between the LLM, the prompt library, and the code repository so that the LLM processes the enterprise software code using the engineered prompt sets, including the pattern recognition prompt sets and the standardized solution prompt sets; and the LLM is configured to receive enterprise software code and two or more prompt sets, including a pattern recognition prompt set and a standardized solution prompt set, to detect programming-language-specific code patterns in the enterprise software code using the pattern recognition prompt sets, and to generate standardized replacement code in a target programming language using the standardized solution prompt sets for the enterprise software code, the standardized replacement code conforming to a predefined enterprise coding standard comprising at least one enterprise coding constraint.

2. The system of claim 1, wherein the enterprise coding constraint comprises a security constraint requiring that standardized replacement code implement an enterprise-standard security routine.

3. The system of claim 1, wherein the enterprise coding constraint comprises an interoperability constraint requiring that standardized replacement code implement an enterprise-standard communication protocol.

4. The system of claim 1, wherein the enterprise coding constraint comprises a configuration constraint requiring that standardized replacement code conform to an enterprise-standard configuration management practice.

5. The system of claim 1, wherein the programming-language-specific code patterns comprise database access patterns.

6. The system of claim 1, wherein the programming-language-specific code patterns comprise patterns for calling enterprise information technology (IT) services.

7. The system of claim 1, wherein the pattern recognition prompt sets direct the LLM to identify code patterns based at least in part on enterprise-specific contextual information.

8. The system of claim 7, wherein the enterprise-specific contextual information comprises enterprise-specific modules or enterprise-specific connection strings.

9. The system of claim 8, wherein the standardized solution prompt sets direct the LLM to generate replacement code that includes references to specific enterprise modules or systems.

10. The system of claim 1, wherein the LLM comprises a public LLM accessed via an external API.

11. The system of claim 1, further comprising a deployment pipeline configured to validate the standardized replacement code and automatically deploy the code into a production environment.

12. The system of claim 1, wherein the pattern recognition prompt sets correspond to a first programming language, and the standardized solution prompt sets correspond to a second, different programming language.

13. A computer-implemented method for modernizing enterprise software code, the method comprising:

storing, in a code repository, enterprise software code, wherein the enterprise software code comprises programming-language-specific code patterns and wherein the code repository is in communication with a first computer system that runs an orchestration system;

storing, in a prompt library, a plurality of engineered prompt sets, including pattern recognition prompt sets and standardized solution prompt sets, wherein the prompt library is in communication with the first computer system;

receiving, by a second computer system executing a large language model (LLM), enterprise software code from the code repository and one or more prompt sets from the prompt library, the prompt sets including pattern recognition prompt sets and standardized solution prompt sets, wherein;

the LLM of the second computer system is in communication with the code repository and the prompt library via the first computer system and an electronic data network, wherein communication between the first computer system and the LLM comprises invoking the LLM via an authenticated application programming interface (API);

the pattern recognition prompt sets and the standardized solution prompt sets are:

programming-language specific;

have a defined structure including prompt templates and metadata;

direct the LLM to perform pattern recognition and standardized-solution replacement according to structured prompt templates; and impose generation constraints including programming-language-specific templates and deterministic generation parameters, thereby controlling and improving consistency and reliability of output of the LLM; and the orchestration system is configured to mediate access between the LLM, the prompt library, and the code repository;

identifying, by the LLM and based on the pattern recognition prompt sets, one or more programming-language-specific code patterns within the enterprise software code; and generating, by the LLM and based on the standardized solution prompt sets, standardized replacement code in a target programming language, the standardized replacement code conforming to a predefined enterprise coding standard comprising at least one enterprise coding constraint.

14. The method of claim 13, wherein identifying the programming-language-specific code patterns comprises identifying database access patterns.

15. The method of claim 13, wherein identifying the programming-language-specific code patterns comprises identifying patterns for calling enterprise information technology (IT) services.

16. The method of claim 13, wherein identifying the programming-language-specific code patterns is based at least in part on enterprise-specific contextual information.

17. The method of claim 16, wherein the enterprise-specific contextual information comprises enterprise-specific modules or enterprise-specific connection strings.

18. The method of claim 13, wherein the pattern recognition prompt sets correspond to a first programming language, and the standardized solution prompt sets correspond to a second, different programming language.

* * * * *